Sept. 23, 1969   A. H. ENGSTROM   3,468,425
FLUID FILTER ELEMENT

Filed Feb. 16, 1967   2 Sheets-Sheet 1

INVENTOR.
ARTHUR H. ENGSTROM
BY
ATTORNEYS

Sept. 23, 1969  A. H. ENGSTROM  3,468,425
FLUID FILTER ELEMENT
Filed Feb. 16, 1967  2 Sheets-Sheet 2

INVENTOR.
ARTHUR H. ENGSTROM
BY
Kenyon & Kenyon
ATTORNEYS

United States Patent Office 3,468,425
Patented Sept. 23, 1969

3,468,425
FLUID FILTER ELEMENT
Arthur H. Engstrom, Indianapolis, Ind., assignor to
Purolator Products, Inc., Rahway, N.J., a corporation of Delaware
Filed Feb. 16, 1967, Ser. No. 616,535
Int. Cl. B01d 25/24, 25/20
U.S. Cl. 210—490                                    8 Claims

ABSTRACT OF THE DISCLOSURE

A fluid filter element of the substantially cylindrical radial flow type used in automobile filters comprising a hollow cylinder formed of fibrous filter media in web form coiled on itself. Certain of the convolutions of the filter media are axially longer than the other convolutions of the media. In order to provide two stage filtration the entire filter element is impregnated with resin which is cured providing rigidity both radially and longitudinally. In one embodiment the axially longer convolutions are formed from one coil of filter media and the other convolutions are formed from a separate coil of media. In another embodiment a single length of filter media is used the width of a portion of the length being greater than the remaining length of the media.

This invention relates to a fluid filter element of the substantially cylindrical, radial flow type used in automotive oil filters.

Currently automotive oil filters having such filter elements are usually constructed to operate on the so-called full-flow, two-pass principle. When operating on this principle, all of the oil from the lubricating oil pump of the automotive engine passes through the filter and the filtering arrangement provides two filtration flow passes in parallel, one pass providing high efficiency filtration and the other pass providing lower efficiency filtration. The purpose of this is so that after prolonged service which results in dirt loading the filtering medium of the pass of higher efficiency so that its flow resistance becomes excessive, the fluid may thereafter continue to pass through the filtering medium providing the pass of lower filtration efficiency but which still provides some filtration. This delays the time when the fluid is bypassed around both passes by way of the usual bypass arrangement incorporated in such automotive oil filters and which operates when ultimately dirt loading results in the flow resistance of both passes being excessive.

Heretofore, the two passes have been provided in various manners none of which have been completely satisfactory. One example is the use of a cylinder formed from fibrous material compacted to differing degrees of density between radially interspaced perforated metal shells provided with, of course, end caps to confine the radial flow. This construction is expensive to produce and uncertain in operation, but it is an example of a two-pass arrangement of the depth filtration type. Another arrangement consists in the usual perforated metal center tube surrounded for a part of its length by the familiar pleated filter paper element and with its balance surrounded by wood excelsior, open pore sponge material, or other arrangements providing a rather coarse filtration of the depth type for the second pass, with end caps closing the ends. This construction has some service problems and is in addition expensive to make because it must include the perforated metal center tube which supports the filtering media.

The object of the present invention is to provide a fluid filter element of the previously mentioned substantially cylindrical, radial flow type used in automotive oil filters and which provides for two-pass depth-type filtration by a construction that is relatively inexpensive to make while being capable of meeting usual service demands satisfactory, and which will in general be an improvement insofar as this particular art is concerned.

With the foregoing in mind, specific examples of the present invention are illustrated by the accompanying drawings in which:

FIG. 8 is an end view of the above portion.

Figure 1:
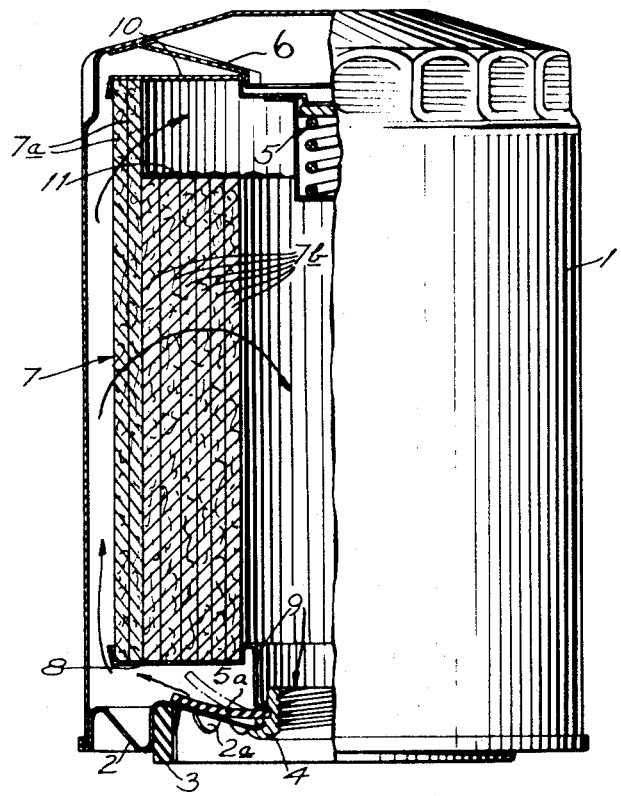
FIG. 1 is a view of an automotive oil filter of the general kind described and having a filter element incorporating the principles of the present invention, this view being partly in elevation and partly in longitudinal section.
Figure 3:
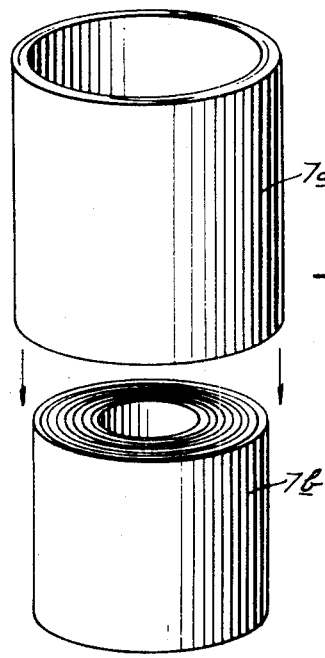
FIG. 3 is an exploded view showing the separate parts of the element of FIG. 2 and indicating the manner in which the parts are assembled.
Figure 2:
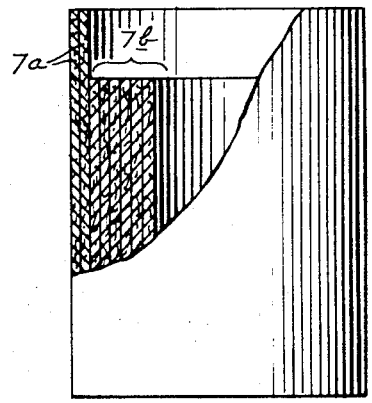
FIG. 2 is a view, again partly in elevation and partly in longitudinal section, of the filter element itself as it appears apart from the filter.

Now, referring first to FIGS. 1–3, the filter with which the new element is used is represented as being one in common use today. It is of the so-called screw-on throwaway type.

In other words, the filter includes the can 1 having a closed outer end and an open inner end closed by a flexible end cap or bottom 2 having a ring seal 3 and mounted on an internally threaded bushing 4. In use, the bushing 4 is screwed on the externally threaded stud of the filter pad of an automotive engine (not shown), this stud receiving the filtered oil for engine lubrication, the space on the pad between this bushing and the seat against which the seal 3 seats being designed to eject the unfiltered oil from the engine, through openings 2a, in the bottom 2, into the can 1. Any filter element having a substantially cylindrical shape and of the radial flow type and with the necessary end caps may be installed in such a filter so that the oil entering the inlets 2a fills the can, flows inwardly through the filter element and exits to the engine through the bushing 4.

Although the above is all that is needed to understand the use of the filter element of the present invention, since other parts are shown it is considered advisable to mention them. Thus, the part 5a is an anti-drainback valve preventing draining of the filter when oil flow stops, the valve generally indicated at 5 is the bypass valve which opens after the filter element becomes so dirty that the oil must be bypassed because of the high flow resistance through the element, and the part shown at 6 is the spring spider which holds and centers the upper end of the filter element.

The new filter element itself comprises a hollow cylinder 7 formed by fibrous filter media in web form coiled on itself to provide enough convolutions to effect a radial thickness adequate for depth-type filtration. Suitable media may be of any fibrous material such as, for example, paper. If paper, it would ordinarily be of relatively greater thickness as compared to that used for wall-type filtration such as when in the case of the familiar pleated paper form.

A relatively large number of convolutions is required for this depth-type filtration and this results in considerable wall thickness, the entire element being impregnated with the resin ordinarily used with paper filters, and then cured by heating in the usual fashion. The result of this is a cylindrical filter which is rigid both radially and longitudinally so that all need for a perforated metal inner or support tube is eliminated. Obviously, no external perforated cylindrical casing is required.

With the above general understanding, attention is now called to the fact that as shown by the drawings the outer two convolutions 7a are axially longer than the other six convolutions 7b. The bottom ends of all the convolutions are flush and are closed by a metal end cap 8 internally forming a tubular, axially extending sleeve 9 pushed over the inwardly projecting end of the bushing 4 to hold and center the element. The outer end edges of the convolutions 7a are closed as is the space above the outer ends of the convolutions 7b by a second end cap 10 which, as shown, may have its central portion constructed to form a part of the bypass valve 5. The end caps 8 and 10 should be designed to force the fluid flow to travel inwardly through the element 7, as indicated by the arrows in FIG. 1, without bypassing unless the valve 5 opens.

In operation the oil flows inwardly through the convolutions 7a and 7b, the latter providing the more effective filtration until dirt loading increases the flow resistance to a point where the majority of the flow is through the convolutions 7a insofar as these portions extend above the convolutions 7b. The number of convolutions in each instance depends on the thickness of the media used, the total wall thickness being, in any event, enough to assure adequate depth-type filtration and adequate structural strength after resin curing. Once dirt loading occurs to a degree producing a pressure differential causing opening of the bypass valve 5, the filter element has reached the end of its life.

As shown in FIG. 1, sealing material 11 forms a fluid-tight seal over the top edges of the shorter convolutions 7b to prevent the oil or other fluid being filtered from taking a shorter flow path then is indicated for depth-type filtration. The seal may be effected by a metal disk (not shown) or by the use of any suitable sealing material which closes the top edges of the convolutions 7b fluid tightly.

There are at least two ways of making this new filter element with differences in the details of its construction. In FIGS. 2 and 3 the convolutions are formed as two separate coils of the media in web form. The web coiled to form the inner or shorter coil of greatest radial depth, that is to say the convolution 7b, is a web of fibrous material that is appreciably narrower than the web used to form the longer coil representing the convolutions 7a.

The two coils may be formed by known techniques, thereafter telescoped together, as represented by FIG. 3, impregnated with the conventional resin and cured by heat to form a rigid self-supporting element. The sealing material 11 or other equivalent must of course be applied but this is a simple operation. Plainly, the result is much less expensive to manufacture than the prior art constructions referred to hereinbefore.

Figure 5:
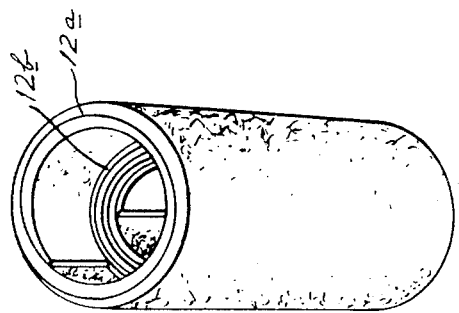
FIG. 5 is a perspective view showing this second form of the element.
Figure 3:
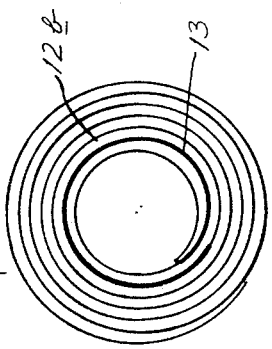
Figure 4:
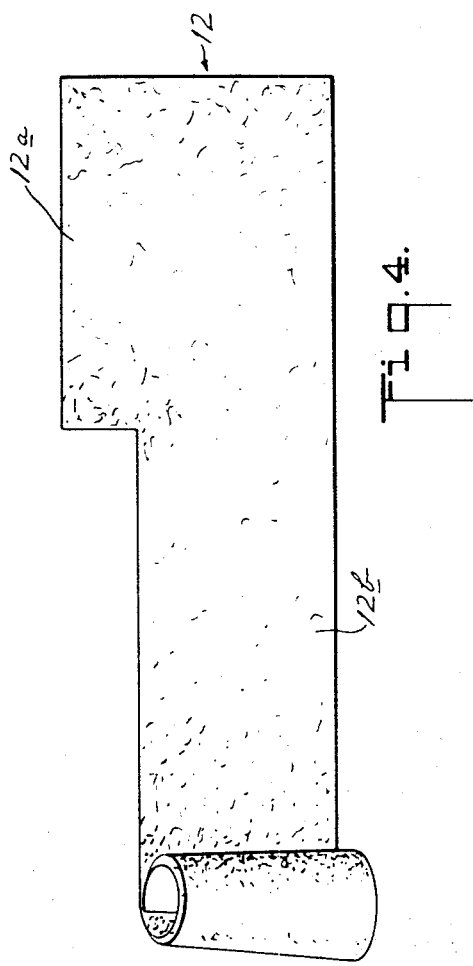
FIG. 4 is a perspective view showing the making of an element incorporating the principles of this invention but with a construction somewhat different from that of the example shown by the preceding figures.
Figure 6:
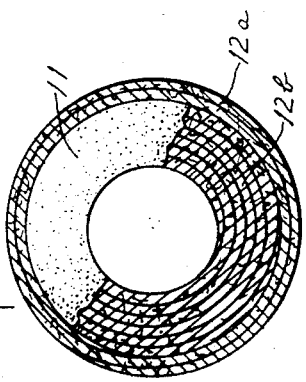
FIG. 6 is an end view of FIG. 5 having a part broken away for illustrative purposes.

In the example shown by FIGS. 4, 5 and 6, the element is made from a single web of filter media 12 so that only one coil results. The media in web form itself varies in width for at least a portion of this length. Thus the portion 12a, after coiling to the form shown by FIG. 5, forms the equivalent of the projecting portions of the convolutions 7a of the first example, while the portion 12b forms the equivalent of the coil formed by the convolutions 7b of the first example. In the end view shown by FIG. 6 the sealant 11 is shown which performs the same function it does in the case of the first example.

Figure 7:
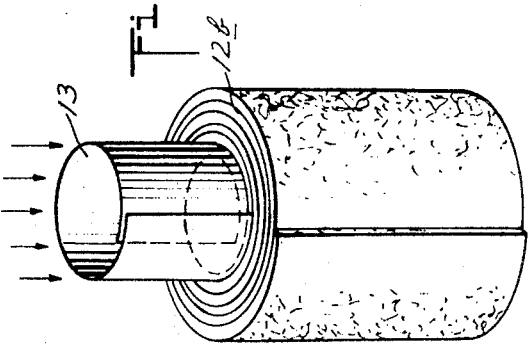
FIG. 7 represents in perspective an assembly of a modified form of this filter element shown as the first example, the part shown representing one portion only of that element.

In the event an absolute filter rating must be met by the new element, a single convolution of a barrier media 13 may, as indicated by FIG. 7, be slipped between two of the inner most ones of the convolutions which may be either the convolutions 12b or the convolutions 7b of the first example. This barrier may consist of any of the wall-type filtering media known to provide a positive barrier to all particles above the predetermined micron size. In the present invention its purpose is only to catch any particles above such a size not entrapped by the depth-type filtering action. The barrier is for insurance purposes.

It can be seen that this invention provides for a filter element which, with proper selection of filter media and design configuration with respect to the element's wall thickness, may provide a high efficiency filter having an extended life and at a more reasonable or less expensive cost than heretofore. The filter element being impregnated with the resin, and considering its thick wall, is rigid after curing so that the use of perforated filter elements is eliminated. The new filter is suitable for use either in a throw-away as illustrated or as a replaceable element in the case of a replaceable element filter. The manufacture of the hollow cylinders presents no problems and present manufacturing techniques are easily capable of assemblying the components insofar as the metal end caps are concerned, and, in the case of the illustrated filter, the various parts required for a complete assembly.

What is claimed is:

1. A fluid filter element of the substantially cylindrical, radial flow type used in automotive oil filters, said element comprising a hollow cylinder formed by fibrous filter media in web form coiled on itself to provide enough convolutions to effect a radial thickness adequate for depth-type filtration, the convolutions of said media at least at one end of said cylinder being axially displaced relative to each other to provide the cylinder with differing radial thicknesses and therefore differing radial fluid flow resistances, some of said convolutions being axially longer than others and all of said convolutions having their ends flush with each other at one end of said cylinder, and means for confining fluid flow to a radial flow through said convolutions.

2. The element of claim 1 in which said media is resin impregnated so that it is relatively rigid and radially self-supporting against the pressure of the fluid when in service.

3. The element of claim 1 in which said cylinder is formed by two coils of said media in web form with the latter having one width for one coil and a different width for the other, the two coils being telescoped together.

4. The element of claim 1 in which said cylinder comprises one single coil of said media in web form with the latter varying in width for at least one portion of its length.

5. The element of claim 3 in which at the end of said cylinder where the convolution edges are relatively offset a substantially fluid-tight seal is formed over the edges of the shorter convolutions.

6. The element of claim 4 in which at the end of said cylinder where the convolution edges are relatively offset a substantially fluid-tight seal is formed over the edges of the shorter convolution.

7. The element of claim 5 in which a wall-type filter layer is interleaved with the inner convolutions.

8. The element of claim 6 in which a wall-type filter layer is interleaved with the inner convolutions.

References Cited

UNITED STATES PATENTS

| 2,537,897 | 1/1951 | Hunted | 210—494 |
|---|---|---|---|
| 2,598,322 | 5/1952 | Vokes | 210—130 |
| 3,042,216 | 7/1962 | Goldman | 210—489 X |
| 3,268,077 | 8/1966 | Ball | 210—131 |
| 3,305,095 | 2/1967 | Hathaway | 210—130 |

REUBEN FRIEDMAN, Primary Examiner

J. ADEE, Assistant Examiner

U.S. Cl. X.R.

210—492, 494